H. A. BEYER AND C. A. KOHRER.
BAND FORMING AND APPLYING MACHINE.
APPLICATION FILED MAR. 21, 1918.

1,333,377.

Patented Mar. 9, 1920.
5 SHEETS—SHEET 3.

Inventors:
Henry A. Beyer
Carl A. Kohrer
by their attorneys

H. A. BEYER AND C. A. KOHRER.
BAND FORMING AND APPLYING MACHINE.
APPLICATION FILED MAR. 21, 1918.

1,333,377.

Patented Mar. 9, 1920.
5 SHEETS—SHEET 4.

Inventors:
Henry A. Beyer
Carl A. Kohrer
by their attorneys

UNITED STATES PATENT OFFICE.

HENRY A. BEYER, OF CORONA, AND CARL A. KOHRER, OF MIDDLE VILLAGE, NEW YORK, ASSIGNORS TO PARAGON CAN & CAP COMPANY, INC., OF BROOKLYN, NEW YORK, A CORPORATION OF NEW YORK.

BAND FORMING AND APPLYING MACHINE.

1,333,377. Specification of Letters Patent. Patented Mar. 9, 1920.

Application filed March 21, 1918. Serial No. 223,759.

*To all whom it may concern:*

Be it known that we, HENRY A. BEYER and CARL A. KOHRER, citizens of the United States, and residents, respectively, of Corona, in the county of Queens and State of New York, and of Middle Village, in the county of Queens and State of New York, have invented a new and useful Improvement in Band Forming and Applying Machines, of which the following is a specification.

This invention relates to a band forming and applying machine, with the object in view of providing apparatus of this character which will form a band from sheet material and associate the same with a previously formed article, such, for instance, as a screw cap for bottles or jars.

Another object consists in providing apparatus of this character in which the operations are performed automatically and successively from the step of severing the strip of sheet material to form the band to the final step of ejectment of the article with the band associated therewith.

A further object consists in providing such an apparatus which is comparatively compact and simple in construction, while durable and effective in operation.

A still further object is to provide certain improvements in the construction, form and arrangement of the various parts, whereby the above named and other objects may be effectively attained.

A practical embodiment of our invention is represented in the accompanying drawings, in which—

The sheet material, which may be tin, from which the band is to be formed, is denoted by 1 and it is arranged to be yieldingly urged endwise toward the cutting mechanism of the machine in any suitable manner.

Figures 1, 16:
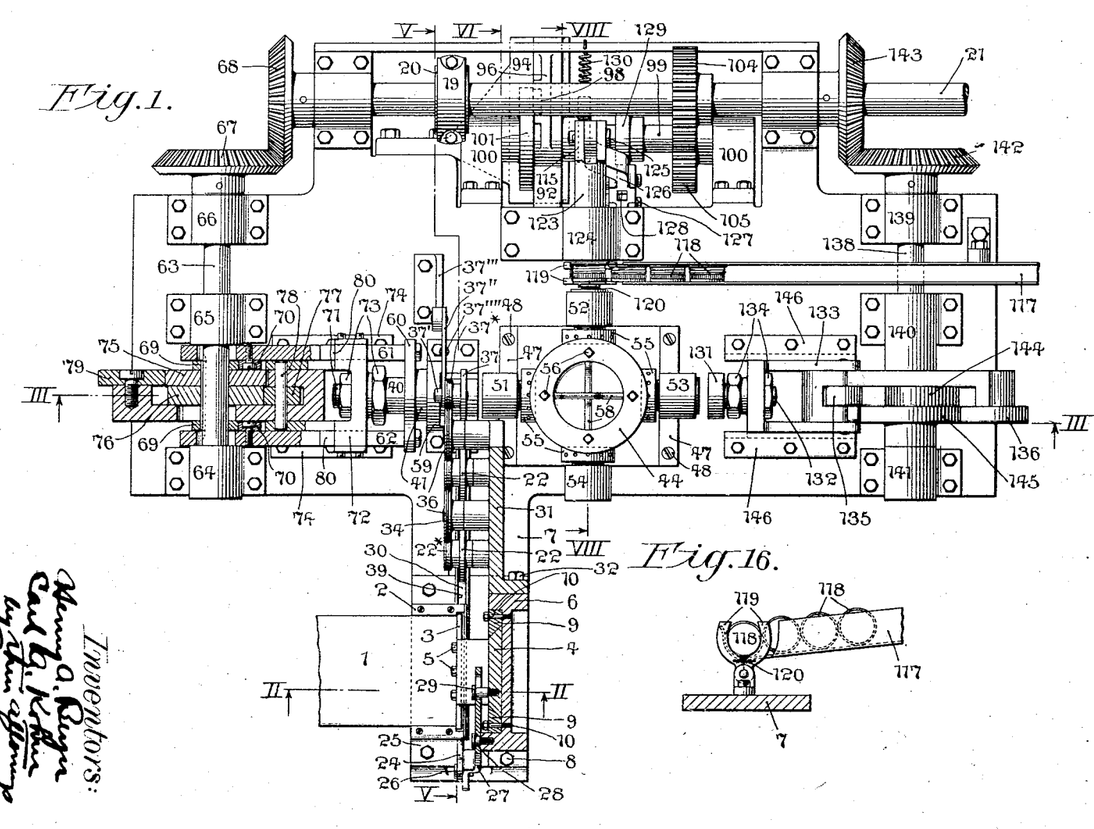
Figure 1 represents a top plan view of the apparatus, partly in section.
Fig. 16 represents a detail section, partly in elevation, showing the cap feeding mechanism.
Figures 2, 3:
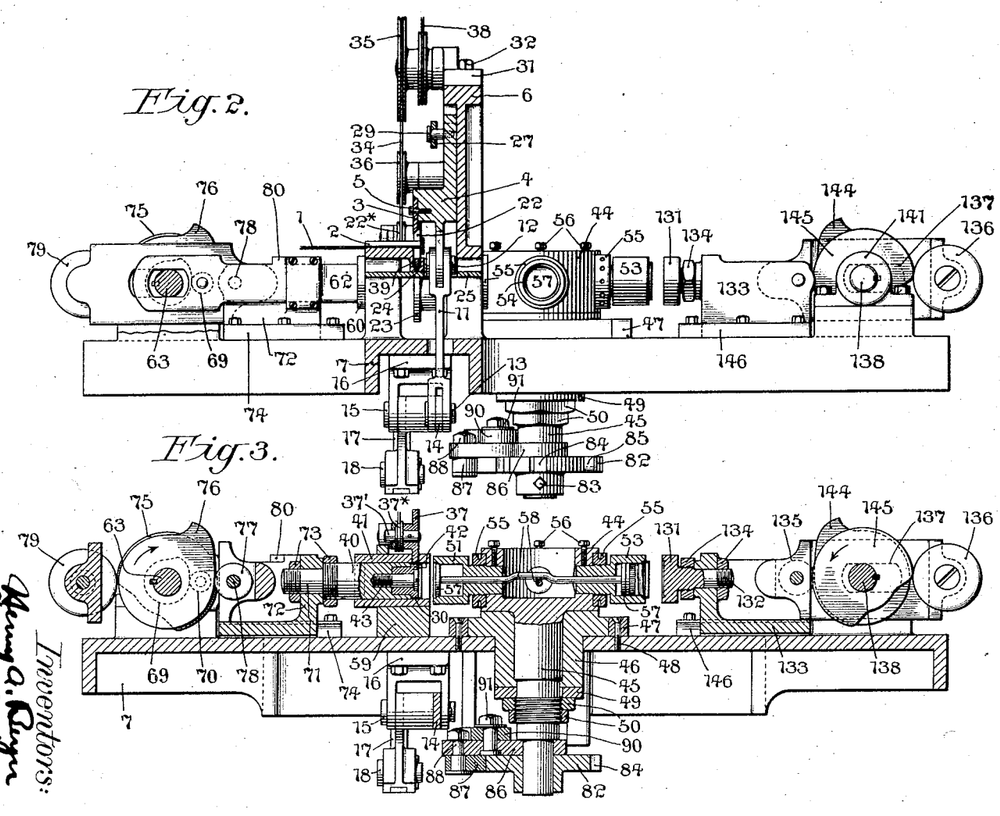
Fig. 2 represents a vertical section taken in the plane of the line II—II of Fig. 1, looking in the direction of the arrows.
Fig. 3 represents a vertical section taken in the plane of the line III—III of Fig. 1, looking in the direction of the arrows.
Figures 4, 5:
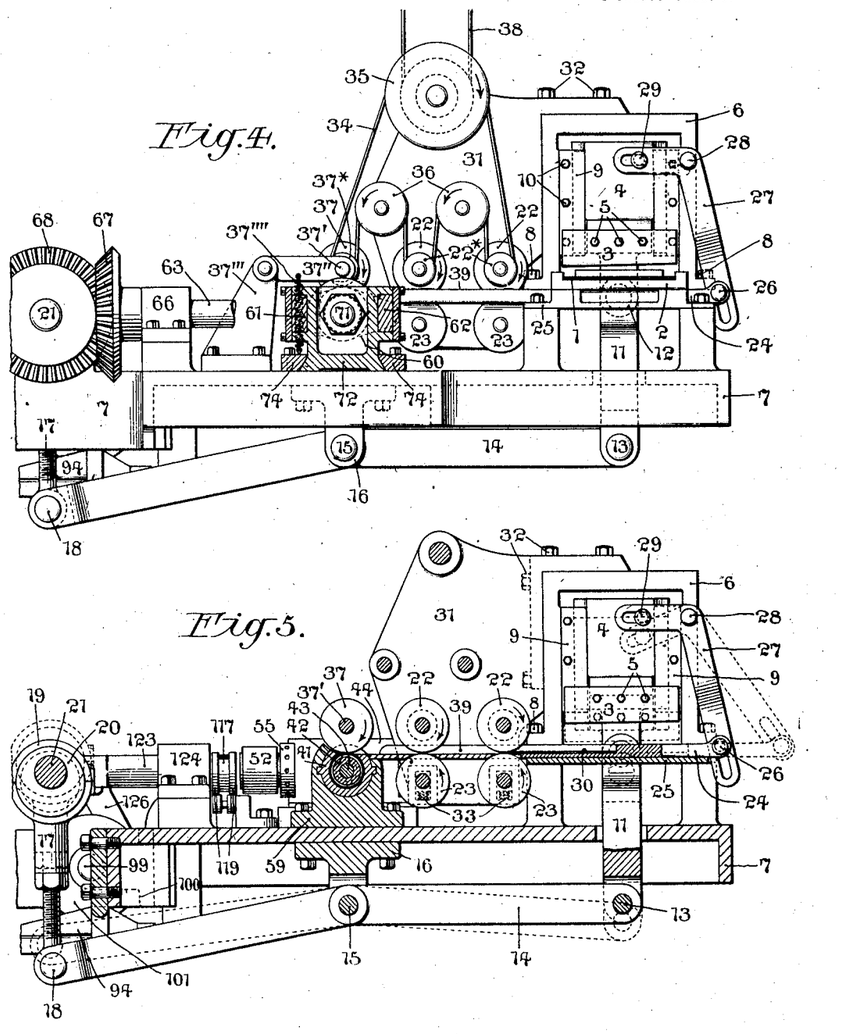
Fig. 4 represents an end elevation, partly in section and partly broken away.
Fig. 5 represents a vertical section taken in the plane of the line V—V of Fig. 1, looking in the direction of the arrows, partly broken away; different positions of certain parts being shown in full and dotted lines.
Figure 6:
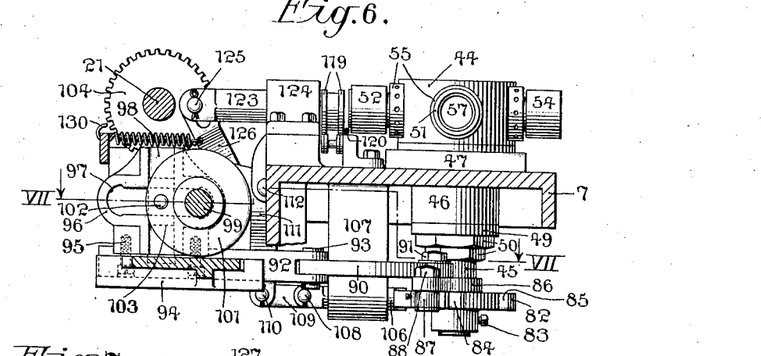
Fig. 6 represents a detail section taken in the plane of the line VI of Fig. 1, looking in the direction of the arrow.
Figure 7:
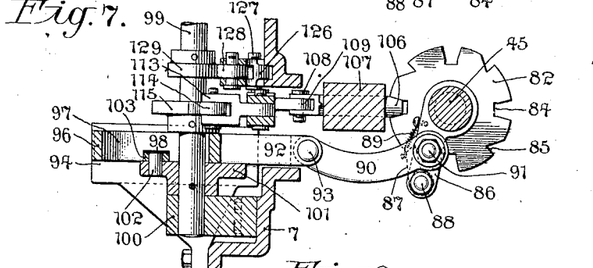
Fig. 7 represents a detail section taken in the plane of the line VII—VII of Fig. 6, looking in the direction of the arrows.

The cutting mechanism comprises a guide 2 in which the end of the sheet material rests, as clearly shown in Fig. 1, the inner edge of which guide serves as one element of the shearing or cutting means. A knife 3 (see Fig. 2) is designed to perform the actual cutting of the sheet metal, and, to this end, it is secured to a slide 4 by means of cap screws 5, which slide 4 is fitted to be periodically reciprocated in a vertical direction in a guide frame 6, which is secured to the main frame 7 of the machine by cap screws 8. It will be noted that the side edges of the slide 4 are beveled (see Figs. 1, 4 and 5) and that gibs 9 are secured by cap screws 10 to the frame 6 for the purpose of holding the slide 4 in position.

The means for actuating the slide 4 consists of an arm 11 (see Fig. 2), one end of which is pivoted to the slide 4 by a pin 12 while the other end is similarly secured, as at 13 (see Fig. 5), to the extremity of a walking beam 14 that is fulcrumed at 15 in a lug 16 which projects downwardly from the under side of the machine frame 7. The walking beam 14 is rocked by means of a pitman 17 which has one end pivoted to the walking beam, as at 18, while the other end is provided with a strap 19 surrounding an eccentric 20 that is fixed against rotation on the main power shaft 21 of the machine. It will be seen that, as the shaft 21 revolves, the pitman 17 is reciprocated, thereby imparting, through the walking beam 14, a similar motion to the slide 4, as already indicated, for the purpose of successively severing strips from the end of the sheet 1 that is presented to the knife 3.

After a strip has been severed from the sheet 1, mechanism is provided for advancing it laterally to feed rollers 22, 22, 23, 23. This mechanism consists of a carriage 24 which rests upon a shelf 25 fastened upon the upper part of the machine frame 7. One end of the carriage 24 has a pin and slot engagement 26 with a bell crank 27 that is pivoted at 28 in the guide frame 6, and has its other end secured by means of a pin and slot connection 29 with the slide 4. The carriage 24 has its inner end reduced so as to form a recess for the reception of the severed strip 30. From the foregoing description, it will be seen that the reciprocation of the slide 4 imparts a similar reciprocatory movement to the carriage 24, the relation being such that the upward movement of the slide 4 results in an inward movement of the carriage 24, thereby advancing the severed strip 30, immediately after it has been severed, to the feed rolls 22 and 23.

The feed rolls 22 are rotatably mounted in an upright support 31 which is secured to the guide frame 6 by cap screws 32; while the rolls 23 are mounted in spring boxes 33 fixed to the said support, the relation being such that the springs in the boxes will yieldingly hold the rolls 23 at the limit of their upward movement, in a familiar and well understood manner.

Motion is imparted to the feed rolls by means of a drive belt 34 (Fig. 4), which is threaded around a main drive pulley 35, a pair of idler pulleys 36, mounted in the support 31, pulleys 22* integral with the feed rolls 22 and a pulley 37* integral with an additional feed roll 37. The main drive pulley 35 may be rotated by a belt 38 which is actuated from a suitable source of power not shown.

The feed roll 37 and pulley 37* are fixed to a stub shaft 37' (see Fig. 3) which is slidably mounted in the end of an arm 37'' (see Fig. 4), that is pivoted in an upright 37''' bolted on the machine frame 7. A retractile coil spring 37'''' serves to draw the arm 37'' downwardly and thus yieldingly hold the roll 37 to its work.

When the severed strip of sheet material 30 has been fed to the first pair of feed rolls 22, 23, it is gripped between the same owing to the resilient mounting of the roll 23, and fed inwardly under the influence of the rotating roll 22. After a short advance, the strip is similarly engaged by the second set of feed rolls 22, 23, and is thereby brought in contact with the feed roll 37. During this passage, the strip 30 is guided in a channel 39 which is fashioned on the frame 7 of the machine.

The strip is now in position to be fed into the mechanism which imparts to it an annular or band form. This mechanism consists of a horn 40 (Fig. 3), that is fitted within a cylinder 41 and which has an end plate 42 secured thereto, by a screw 43; which end plate is slightly less in diameter than the interior of the cylinder 41, thereby allowing a space to exist between the end plate 42 and the cylinder 41 for the reception of the strip 30.

The feed roll 37 is mounted to enter a slit in the cylinder 41 so as to be almost in contact with the end plate 42. Thus, as the strip 30 is advanced to the feed roll 37, its end is gripped between the said roll and the end plate 42 of the horn 40, while the continued rotation of the said feed roll forces the strip around the end plate 42 within the cylinder 41, thereby imparting to the strip an annular form.

The next operation consists of the crimping or curling of one edge of the band formed from the strip 30, and this operation is performed by reciprocating die members, which will now be described. A turret 44 is provided with a downwardly extending stem 45 that is journaled in a suitable bearing 46 which is secured against rotation in the frame 7 by cheek pieces 47 fastened to the said frame by a screw 48. A washer 49 and suitable nuts 50, which are threaded onto the stem 45, serve to retain the turret 44 in its proper mounting.

Four similar hollow die members 51, 52, 53, 54, project laterally, at 90° intervals, from the turret 44, and are secured therein by locking rings 55 and set screws 56. In each of the said die members 51, 52, 53, 54, is fitted a plunger 57, all of the said plungers being of similar form and size and the opposite ones being rigidly connected by rods 58, so that, when one plunger is depressed toward the inner end of its die member, its opposite mate will be simultaneously moved outwardly toward the mouth of its die member.

The arrangement is such (as will be hereinafter described in detail) that the die members 51, 52, 53, 54, are successively moved into alinement with and almost into abutment with the cylinder 41.

The cylinder 41 is slidably mounted in a bearing 59 fixed on top of the frame 7 of the machine, and its rear end is provided with a cross head 60 (see Fig. 1) to which are secured a pair of rails 61, 62, which extend rearwardly and are slotted to permit the loose passage therethrough of a shaft 63, that is journaled at 64, 65 and 66 on the machine frame 7 and is driven from the main shaft 21 by bevel gears 67, 68. A pair of similar cams 69 are splined to the shaft 63 and are fitted to engage rollers 70 that are screwed to the rails 61, 62, whereby the rotation of the shaft 63 will serve to move the said rails inwardly or forwardly, and hence impart the same movement to the cylinder 41, fixed thereto.

The horn 40 is mounted to reciprocate within the cylinder 41, and, to this end, it has a tail 71 that is fixed in one end of a carriage 72 by nuts 73 that are threaded onto the tail 71. The carriage 72 is slidably mounted in gibs 74 that are bolted to the upper side of the machine frame 7. The carriage 72 has a skeleton rearward extension which is fitted to receive the shaft 63 and cams 75, 76, which are keyed thereto. The cam 76 is adapted for operative engagement with a roller 77 that is carried by a pin 78 in the carriage 72 while the cam 75 is fitted for operative contact with a roller 79 that is screwed onto the extreme rear end of the skeleton portion of the carriage 72. By virtue of this arrangement, the cam 76 will serve to move the carriage 72, and hence the horn 40, forwardly or inwardly while the cam 75 will retract the same. The rearward movement of the carriage 72 with respect to the rails 61, 62, connecting it to the cylinder 41, is limited by stops 80 which are formed on the rails 61, 62, and, since the carriage 72 engages these stops before the cam 75 has withdrawn it to its extreme rearward position, the continued action of the said cam serves to simultaneously draw back the rails 61, 62, and hence the cylinder 41, the timing being such that the rollers 70 are at all times retained in engagement with the cams 69.

The combined result of the mechanism just described is such that the horn 40 and the cylinder 41 are reciprocated both absolutely and relatively to each other.

Figure 10:
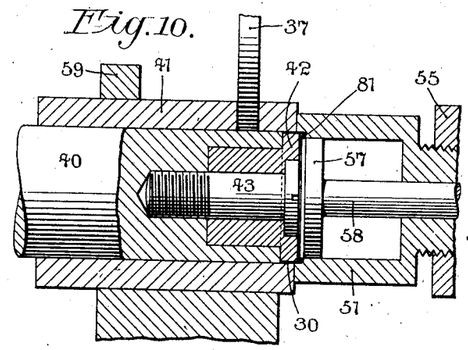
Fig. 10 represents an enlarged detail section through the die members for performing the first operation on the band.

When a given die member carried by the turret 44, say the die member 51, has been moved into alinement with the cylinder 41, the operation of curling or crimping an edge of the band formed from the strip 30, is as follows: The cylinder 41 is moved inwardly by the cams 69 into close abutting engagement with the die member 51, and then the horn 40 is moved inwardly, carrying the band with it, until the edge of the latter enters and is firmly pressed in the annular die formation 81 in the member 51. This pressure of the horn 40, when complemented by the shape of the formation 81, will curl or crimp the edge of the band in a well understood manner. At this time the parts are in the position clearly shown in Fig. 10. After this operation has been finished, the cylinder 41 and horn 40 are withdrawn in the manner just described, leaving the band resting in the die formation 81 in the member 51; and the turret 44 is then rotated 90° in order to move the die member 51 and band carried thereby into position for the next operation, which is that of associating a cap with the band. The mechanism for turning the turret 44 a quarter revolution as just mentioned, is shown in Figs. 6 to 9 inclusive, and is constructed as follows: A wheel 82 is fixed, by means of a set screw 83, to the lower end of the stem 45 which is formed integral with the turret 44. This wheel 82 has its periphery provided with four notches 84 which are fitted to receive an implement to hold the wheel against rotation in either direction, and four notches 85 which are shaped like the teeth of a ratchet and adapted for engagement with a pawl or other similar device for holding the wheel 82 against rotation in one direction only. The notches 84, 85, are alternately disposed.

An arm 86 is loosely mounted on the stem 45 adjacent the wheel 82, and to its extremity a pawl 87 is pivoted, as at 88. A retractile coil spring 89 is secured to the pawl 87 and the arm 86 for the purpose of normally drawing the pawl inwardly toward the wheel 82. A link 90 has one end pivoted to the arm 86, at 91, and the other end pivoted to the extremity of a slide 92, as shown at 93, which slide 92 is fitted to reciprocate in a bed 94 that is supported from the rear side of the machine frame 7.

To the slide 92 there is secured, by screws 95, a yoke 96 which has a slot 97 and a groove 98 disposed at right angles to each other. The slot 97 serves for the passage of a countershaft 99 which is journaled in bearings 100 (see Fig. 1) bolted to one side of the machine frame 7. A disk 101 is pinned to the shaft 99 so as to rotate therewith and is provided at one side with a trunnion 102 which carries an oblong block 103. The countershaft 99 is driven from the main shaft 21 by a pair of gears 104, 105, and the construction just described is such that the rotation of the disk 101 will cause a reciprocation of a yoke 96, and hence of the slide 92 to which it is secured; this reciprocation alternately swinging the arm 86 outward and backward, thereby, through the intermediation of the pawl, moving the wheel 82 a distance equivalent to the space between two adjacent ratchet notches 85, which is 90°.

Mechanism is also provided for temporarily holding or locking the wheel 82 in each position to which it is moved by its actuating means just described, and this mechanism consists of a dog 106 fitted to slide in a lug 107 depending from the under side of the machine frame 7, which dog has its rear end pinned, as at 108, to a link 109, the other end of which link is pinned, as at 110, to the extremity of the long arm 111 of a bell crank lever which is fulcrumed at 112 in the machine frame 7. The short arm 113 of the bell crank carries a roller 114 and is adapted to engage a cam 115 which is pinned on the countershaft 99. A retractile spring 116 is secured to the arm 111 of the bell crank and to the lug 107, whereby the roller 114 is yieldingly held in contact with the cam 115 at all times. As will be readily seen from the immediately foregoing description, the cam 115 will periodically withdraw the dog 106 from engagement with a notch 84 in the wheel 82 and the timing of the parts is such that this withdrawal will take place immediately before the pawl 87 and arm 86 start to move the wheel 82 a quarter revolution; while, immediately the said movement of the wheel 82 has been completed, the cam 115 will permit the spring 116 to cause the dog 106 to snap back into a notch 84 in the wheel 82, thereby holding it, and hence the turret 44 to which it is fixed, firmly in a given position for a predetermined interval of time.

Thus, the apparatus just described will serve to move the die member 51 and the band carried thereby from its position adjacent the cylinder 41 to the position which is occupied by the die member 52 in Fig. 1, in which position the next operation, which is that of associating the band with a cap, is to be performed. In order to accomplish this operation, an inclined chute 117 (see Fig. 1) is provided for feeding in the caps 118, each cap being retained at the lower end of the chute 117 by a clip of Y formation, composed of two arms 119 yieldingly held together by a retractile coil spring 120 (see Fig. 16).

Figure 15:
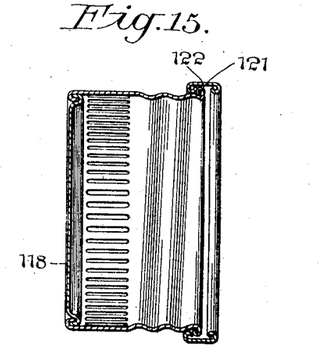
Fig. 15 represents a central section through the cap and band.

The caps are fed in with their tops or closed ends toward the turret 44, and, by reference to Fig. 15, it will be observed that the lower edge or margin of the caps is provided with an outwardly turned bead 121, which bead is adapted to coöperate with the curled or crimped edge of the band, which may be designated in its annular formation by 122, to assist in retaining the latter in association with the cap. The cap is associated with the band by plunger mechanism which will now be described, reference being had to Figs. 8 and 9 of the drawings.

Figures 8, 9:
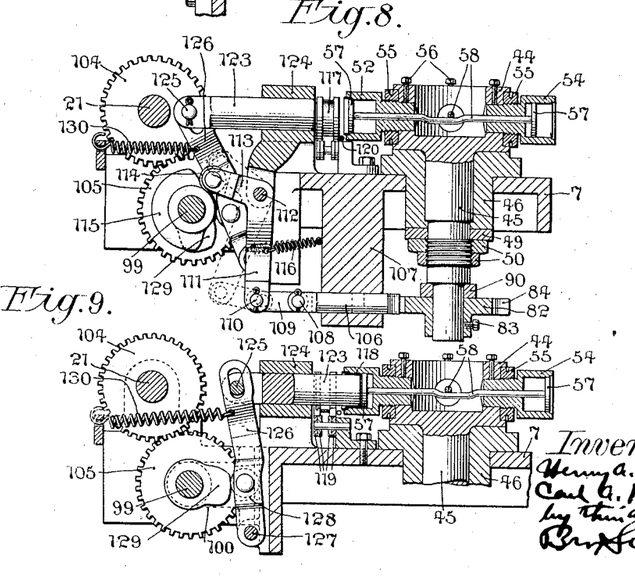
Fig. 8 represents a detail section taken in the plane of the line VIII—VIII of Fig. 1, looking in the direction of the arrows; certain parts being shown in different positions in full and dotted lines.
Fig. 9 represents a detail section, similar to Fig. 8, certain parts being removed.
Figure 11:
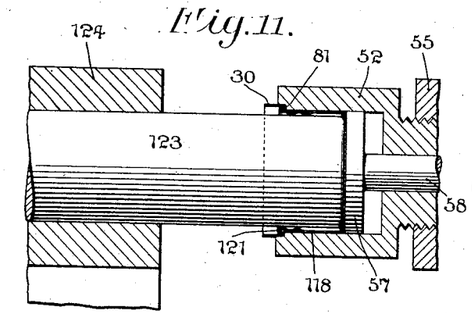
Fig. 11 represents a similar view through the parts for associating the band with the cap.

A plunger 123 is fitted to reciprocate in a bore 124 secured upon the top 7 of the machine and in alinement with the lower end of the cap chute 117. The rear end of the plunger has a pin and slot engagement 125 with a lever 126 that is fulcrumed at 127 in the machine frame 7. Intermediate the ends of the lever 126 a roller 128 is mounted, which roller is adapted for engagement with a cam 129 that is fixed against rotation on the countershaft 99. A retractile coil spring 130 has one end secured to the lever 126 and the other to the frame 7 of the machine, at the rear of the said lever, which spring tends to normally hold the roller 128 in yielding engagement with the cam 129. Thus, the arrangement is such that the rotation of the countershaft 99 serves to periodically force the plunger 123 forwardly toward the adjacent die member 51 carried by the turret 44, which movement of the plunger 123 serves to force a cap 118 laterally out of the lower end of the chute 117 and into the said adjacent die member which carries in its die formation 81 a band 122 having one edge thereof crimped or curled as already described. This movement of the cap 118 causes it to pass through the said band until the beading 121 on the cap engages the crimped edge of the band 122. This position of the cap and band is shown in Fig. 9 and in an enlarged view in Fig. 11. After this has been accomplished the high part of the cam 129 has moved away from the roller 128, and the spring 130 is thus permitted to retract the plunger 123, leaving the cap and band, as associated, in the die member 51.

After this association of the cap and band, the turret 44 is moved another quarter revolution, by the mechanism already described, so as to bring the die member 51 into the position held by the die member 53 in Fig. 1 of the drawings, in which position the parts are in alinement with the reciprocating die mechanism designed to crimp the other edge of the band 122, so that it may take the configuration clearly shown in Fig. 15. This mechanism (see Figs. 2 and 3) consists of a die member 131 which is mounted by its stem 132 in a reciprocating carriage 133, the die member being held in position on said carriage by nuts 134 threaded on the stem 132. The carriage 133 has a rearwardly extended skeleton frame which carries cam rollers 135 and 136, and which has a slot 137 for permitting the passage therethrough of a cam shaft 138 (Fig. 1), that is journaled at 139, 140, 141, on the machine frame 7, and is driven from the main shaft 21 by bevel gears 142, 143. Upon the cam shaft 138 a pair of cams 144 and 145 are keyed, the former being designed for coaction with the roller 135 and the latter for coaction with the roller 136.

It will be seen that, by the rotation of the shaft 138, there will be imparted to the carriage 133 a reciprocating motion in the ways 146, the cam 144 forcing the carriage forwardly toward the turret 44 and the cam 145 withdrawing the carriage.

Figure 12:
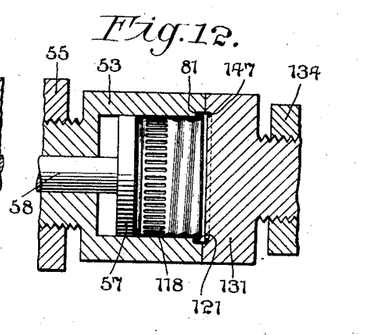
Fig. 12 represents a similar view through the die members for performing the last operation upon the band.

The die member 131 is provided with a die formation 147 quite similar to the formation 81, and, as it is advanced into abutting engagement with the die member 51, under the influence of the cam 144, it will crimp the previously uncrimped edge of the band 122, in a manner similar to that in which the other edge had previously been crimped, so as to give the band a sectional formation such as shown in Fig. 15. During this operation, the band is supported in the die member 51 by its die formation 81 and the cap is supported partly by the curled or crimped edge of the band and partly by the plunger 57. At the completion of this operation, the parts are in the position clearly shown in Fig. 12, and immediately thereafter the cam 145 withdraws the carriage 133 and die member 131, so as to leave the die member 51 with its cap and band free to be moved another quarter revolution of the turret 44 for the final step in the operation of the machine, which consists of the ejectment of the cap and its associated band from the die member 51. This final movement of the turret 44 is accomplished by the mechanism already described, and the ejectment of the cap and band is accomplished by the plunger 57 under the influence of the plunger 123.

Figure 13:
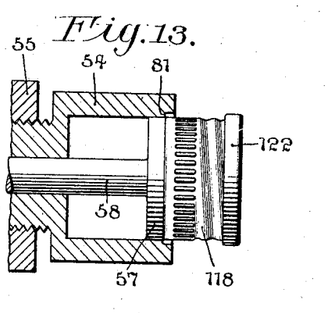
Fig. 13 represents a similar view through the ejecting mechanism.
Figure 14:
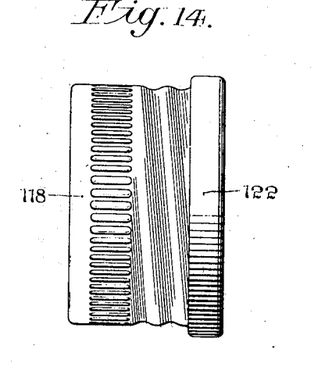
Fig. 14 represents a side view of the cap with the band thereon.

It will be noted that the final position of the die member 51 carrying the cap and its associated and crimped band, is that occupied by the die member 54 in Fig. 1, while the plunger rod 123 operates at a diametrically opposed point on the turret 44. Hence, the movement of the plunger 123 which forces the cap 118 into the adjacent die member carried by the turret 44, causes the said cap to depress the adjacent plunger 57, which movement, through the connecting rod 58, serves to move the opposite plunger 57 forwardly in its die member, thereby ejecting the cap and its associated and crimped band from the apparatus into an appropriate receptacle. This operation is clearly shown in Fig. 13.

We have described, for the purpose of clearness, the formation of a single band from a strip of the sheet material 1, and the step by step operation of the machine while the said band is being carried around by the member 51; but it will be understood that each one of the die members 51, 52, 53, 54, is of the same construction and that each one goes through the operations of receiving a band, crimping the same, associating it with the cap, again crimping the band, and finally ejecting the cap and band, just as described in connection with the member 51.

It will also be understood that the rotation of the main shaft 21 may be caused by any well known or approved manner of applying power, such as by belt from a power shaft, or an electric motor, etc.; but as such a matter is within the common knowledge of the art, no such arrangement has been shown.

The machine as a whole is preferably composed of iron and steel or any other suitable material which may come to the hand of the manufacturer and be deemed appropriate.

As the operation of the machine has been described step by step, in connection with the construction thereof, it is not deemed to be necessary to rehearse the same.

We desire it to be understood that various changes may be resorted to in the form, construction and arrangement of the several parts without departing from the spirit and scope of our invention; and hence that we do not intend to be limited to the details herein shown and described except as they may be specifically included in the claims.

What we claim is:—

1. Apparatus of the character described comprising, means for forming a strip into a band, means for feeding a cap having a bead, means for crimping an edge of the band, and means for associating the band and cap with the crimped edge of the band adjacent the bead on the cap.

2. Apparatus of the character described comprising, means for feeding a strip, means for forming the strip into a band, means for feeding a cap having a bead, means for crimping an edge of the band, and means for associating the band and cap with the crimped edge of the band adjacent the bead on the cap.

3. Apparatus of the character described comprising, means for severing a strip from a sheet, means for forming the strip into a band, means for feeding a cap having a bead, means for crimping an edge of the band, and means for associating the band and cap with the crimped edge of the band adjacent the bead on the cap.

4. Apparatus of the character described comprising, means for severing a strip from a sheet, means for feeding the strip, means for forming said strip into a band, means for feeding a cap having a bead, means for crimping an edge of the band, and means for associating the band and cap with the crimped edge of the band adjacent the bead on the cap.

5. Apparatus of the character described comprising, means for forming a strip into a band, means for feeding a cap having a bead, means for crimping an edge of the band, means for associating the band and cap with the crimped edge of the band adjacent the bead on the cap, and means for crimping the other edge of the band after it has been associated with the cap.

6. Apparatus of the character described comprising, means for feeding a strip, means for forming the strip into a band, means for feeding a cap having a bead, means for crimping an edge of the band, means for associating the band and cap with the crimped edge of the band adjacent the bead on the cap, and means for crimping the other edge of the band after it has been associated with the cap.

7. Apparatus of the character described comprising, means for severing a strip from a sheet, means for forming the strip into a band, means for feeding a cap having a bead, means for crimping an edge of the band, means for associating the band and cap with the crimped edge of the band adjacent the bead on the cap, and means for crimping the other edge of the band after it has been associated with the cap.

8. Apparatus of the character described comprising, means for severing a strip from a sheet, means for feeding the strip, means for forming said strip into a band, means for feeding a cap having a bead, means for crimping an edge of the band, means for associating the band and cap with the crimped edge of the band adjacent the bead on the cap, and means for crimping the other edge of the band after it has been associated with the cap.

9. Apparatus of the character described comprising, means for forming a strip into a band, means complementary to said first-named means for crimping an edge of the band, means for supporting a cap, means for associating the band with the cap, means for crimping the other edge of the band after it has been associated with the cap, means for transferring the band from the first named means to the cap supporting means, and for transferring the cap and band from the cap supporting means to the last-named crimping means.

10. Apparatus of the character described comprising, means for feeding a strip, means for forming the strip into a band, means complementary to said forming means for crimping an edge of the band, means for supporting a cap, means for associating the band with the cap, means for crimping the other edge of the band after it has been associated with the cap, means for transferring the band from the forming means to the cap supporting means, and for transferring the cap and band from the cap supporting means to the last-named crimping means.

11. Apparatus of the character described comprising, means for forming a strip into a band, means complementary to said first-named means for crimping an edge of the band, means for feeding and supporting a cap, means for associating the band with the cap, means for crimping the other edge of the band after it has been associated with the cap, means for transferring the band from the first named means to the cap supporting means, and for transferring the cap and band from the cap supporting means to the last-named crimping means.

12. Apparatus of the character described comprising, means for feeding a strip, means for forming the strip into a band, means complementary to said forming means for crimping an edge of the band, means for feeding and supporting a cap, means for associating the band with the cap, means for crimping the other edge of the band after it has been associated with the cap, means for transferring the band from the forming means to the cap supporting means, and for transferring the cap and band from the cap supporting means to the last-named crimping means.

13. Apparatus of the character described comprising, means for severing a strip from a sheet, means for forming the strip into a band, means complementary to said forming means for crimping an edge of the band, means for supporting a cap, means for associating the band with the cap, means for crimping the other edge of the band after it has been associated with the cap, means for transferring the band from the forming means to the cap supporting means, and for transferring the cap and band from the cap supporting means to the last-named crimping means.

14. Apparatus of the character described comprising, means for severing a strip from a sheet, means for feeding the strip, means for forming said strip into a band, means complementary to said forming means for crimping an edge of the band, means for supporting a cap, means for associating the band with the cap, means for crimping the other edge of the band after it has been associated with the cap, means for transferring the band from the forming means to the cap supporting means, and for transferring the cap and band from the cap supporting means to the last-named crimping means.

15. Apparatus of the character described comprising, means for severing a strip from a sheet, means for forming the strip into a band, means complementary to said forming means for crimping an edge of the band, means for feeding and supporting a cap, means for associating the band with the cap, means for crimping the other edge of the band after it has been associated with the cap, means for transferring the band from the forming means to the cap supporting means, and for transferring the cap and band from the cap supporting means to the last-named crimping means.

16. Apparatus of the character described comprising, means for severing a strip from a sheet, means for feeding the strip, means for forming the said strip into a band, means complementary to said forming means for crimping an edge of the band, means for feeding and supporting a cap, means for associating the band with the cap, means for crimping the other edge of the band after it has been associated with the cap, means for transferring the band from the forming means to the cap supporting means, and for transferring the cap and band from the cap supporting means to the last-named crimping means.

17. Apparatus of the character described comprising, means for forming a strip into a band, means complementary to said first-named means for crimping an edge of the band, means for supporting a cap having a bead, means for associating the band with the cap with the crimped edge of the band adjacent the bead on the cap, means for crimping the other edge of the band after it has been associated with the cap, means for transferring the band from the first named means to the cap supporting means, and for transferring the cap and band from the cap supporting means to the last-named crimping means.

18. Apparatus of the character described comprising, means for feeding a strip, means for forming the strip into a band, means complementary to said forming means for crimping an edge of the band, means for supporting a cap having a bead, means for associating the band with the cap with the crimped edge of the band adjacent the bead on the cap, means for crimping the other edge of the band after it has been associated with the cap, means for transferring the band from the forming means to the cap supporting means, and for transferring the cap and band from the cap supporting means to the last-named crimping means.

19. Apparatus of the character described comprising, means for forming a strip into a band, means complementary to said first-named means for crimping an edge of the band, means for feeding and supporting a cap having a bead, means for associating the band with the cap with the crimped edge of the band adjacent the bead on the cap, means for crimping the other edge of the band after it has been associated with the cap, means for transferring the band from the first named means to the cap supporting means, and for transferring the cap and band from the cap supporting means to the last-named crimping means.

20. Apparatus of the character described comprising, means for feeding a strip, means for forming the strip into a band, means complementary to said forming means for crimping an edge of the band, means for feeding and supporting a cap having a bead, means for associating the band with the cap with the crimped edge of the band adjacent the bead on the cap, means for crimping the other edge of the band after it has been associated with the cap, means for transferring the band from the forming means to the cap supporting means, and for transferring the cap and band from the cap supporting means to the last-named crimping means.

21. Apparatus of the character described comprising, means for severing a strip from a sheet, means for forming the strip into a band, means complementary to said forming means for crimping an edge of the band, means for supporting a cap having a bead, means for associating the band with the cap with the crimped edge of the band adjacent the bead on the cap, means for crimping the other edge of the band after it has been associated with the cap, means for transferring the band from the forming means to the cap supporting means, and for transferring the cap and band from the cap supporting means to the last-named crimping means.

22. Apparatus of the character described comprising, means for severing a strip from a sheet, means for feeding the strip, means for forming said strip into a band, means complementary to said forming means for crimping an edge of the band, means for supporting a cap having a bead, means for associating the band with the cap with the crimped edge of the band adjacent the bead on the cap, means for crimping the other edge of the band after it has been associated with the cap, means for transferring the band from the forming means to the cap supporting means, and for transferring the cap and band from the cap supporting means to the last-named crimping means.

23. Apparatus of the character described comprising, means for severing a strip from a sheet, means for forming the strip into a band, means complementary to said forming means for crimping an edge of the band, means for feeding and supporting a cap having a bead, means for associating the band with the cap with the crimped edge of the band adjacent the bead on the cap, means for crimping the other edge of the band after it has been associated with the cap, means for transferring the band from the forming means to the cap supporting means, and for transferring the cap and band from the cap supporting means to the last-named crimping means.

24. Apparatus of the character described comprising, means for severing a strip from a sheet, means for feeding the strip, means for forming the said strip into a band, means complementary to said forming means for crimping an edge of the band, means for feeding and supporting a cap having a bead, means for associating the band with the cap with the crimped edge of the band adjacent the bead on the cap, means for crimping the other edge of the band after it has been associated with the cap, means for transferring the band from the forming means to the cap supporting means, and for transferring the cap and band from the cap supporting means to the last-named crimping means.

25. Apparatus of the character described comprising, means for forming a strip into a band, means complementary to said first-named means for crimping an edge of the band, means for supporting a cap having a bead, means for associating the band with the cap with the crimped edge of the band adjacent the bead on the cap, means for crimping the other edge of the band after it has been associated with the cap, means for transferring the band from the first named means to the cap supporting means and for transferring the cap and band from the cap supporting means to the last-named crimping means, and means for ejecting the cap and band.

26. Apparatus of the character described comprising, means for feeding a strip, means for forming the strip into a band, means complementary to said forming means for crimping an edge of the band, means for supporting a cap having a bead, means for associating the band with the cap with the crimped edge of the band adjacent the bead on the cap, means for crimping the other edge of the band after it has been associated with the cap, means for transferring the band from the forming means to the cap supporting means, and for transferring the cap and band from the cap supporting means to the last-named crimping means, and means for ejecting the cap and band.

27. Apparatus of the character described comprising, means for forming a strip into a band, means complementary to said first-named means for crimping an edge of the band, means for feeding and supporting a cap having a bead, means for associating the band with the cap with the crimped edge of the band adjacent the bead on the cap, means for crimping the other edge of the band after it has been associated with the cap, means for transferring the band from the first named means to the cap supporting means and for transferring the cap and band from the cap supporting means to the last-named crimping means, and means for ejecting the cap and band.

28. Apparatus of the character described comprising, means for feeding a strip, means for forming the strip into a band, means complementary to said forming means for crimping an edge of the band, means for feeding and supporting a cap having a bead, means for associating the band with the cap with the crimped edge of the band adjacent the bead on the cap, means for crimping the other edge of the band after it has been associated with the cap, means for transferring the band from the first named means to the cap supporting means and for transferring the cap and band from the cap supporting means to the last-named crimping means, and means for ejecting the cap and band.

29. Apparatus of the character described comprising, means for severing a strip from a sheet, means for forming the strip into a band, means complementary to said forming means for crimping an edge of the band, means for supporting a cap having a bead, means for associating the band with the cap with the crimped edge of the band adjacent the bead on the cap, means for crimping the other edge of the band after it has been associated with the cap, means for transferring the band from the forming means to the cap supporting means and for transferring the cap and band from the cap supporting means to the last-named means, and means for ejecting the cap and band.

30. Apparatus of the character described comprising, means for severing a strip from a sheet, means for feeding the strip, means for forming said strip into a band, means complementary to said forming means for crimping an edge of the band, means for supporting a cap having a bead, means for associating the band with the cap with the crimped edge of the band adjacent the bead on the cap, means for crimping the other edge of the band after it has been associated with the cap, means for transferring the band from the forming means to the cap supporting means and for transferring the cap and band from the cap supporting means to the last-named crimping means, and means for ejecting the cap and band.

31. Apparatus of the character described comprising, means for severing a strip from a sheet, means for forming the strip into a band, means complementary to said forming means for crimping an edge of the band, means for feeding and supporting a cap having a bead, means for associating the band with the cap with the crimped edge of the band adjacent the bead on the cap, means for crimping the other edge of the band after it has been associated with the cap, means for transferring the band from the forming means to the cap supporting means and for transferring the cap and band from the cap supporting means to the last-named crimping means, and means for ejecting the cap and band.

32. Apparatus of the character described comprising, means for severing a strip from a sheet, means for feeding the strip, means for forming the said strip into a band, means complementary to said forming means for crimping an edge of the band, means for feeding and supporting a cap having a bead, means for associating the band with the cap with the crimped edge of the band adajacent the bead on the cap, means for crimping the other edge of the band after it has been associated with the cap, means for transferring the band from the forming means to the cap supporting means and for transferring the cap and band from the cap supporting means to the last-named crimping means, and means for ejecting the cap and band.

In testimony that we claim the foregoing as our joint invention we have signed our names, this fifteenth day of March, 1918.

HENRY A. BEYER,
CARL A. KOHRER.